(12) United States Patent
Wüstefeld

(10) Patent No.: US 11,419,447 B2
(45) Date of Patent: Aug. 23, 2022

(54) DRINK MAKER WITH ILLUMINATION DEVICE

(71) Applicant: Miele & Cie. KG, Gütersloh (DE)

(72) Inventor: Michael Wüstefeld, Lippstadt (DE)

(73) Assignee: MIELE & CIE. KG, Gütersloh (DE)

( * ) Notice: Subject to any disclaimer, the term of this patent is extended or adjusted under 35 U.S.C. 154(b) by 0 days.

(21) Appl. No.: 17/117,566

(22) Filed: Dec. 10, 2020

(65) Prior Publication Data

US 2021/0177190 A1 Jun. 17, 2021

(30) Foreign Application Priority Data

Dec. 17, 2019 (DE) ...................... 10 2019 134 625.8

(51) Int. Cl.
| | | |
|---|---|---|
| *A47J 31/06* | (2006.01) | |
| *A47J 31/44* | (2006.01) | |
| *A47B 77/08* | (2006.01) | |
| *F21V 33/00* | (2006.01) | |
| *F21Y 115/10* | (2016.01) | |

(52) U.S. Cl.
CPC .......... *A47J 31/4403* (2013.01); *A47B 77/08* (2013.01); *F21V 33/0044* (2013.01); *F21Y 2115/10* (2016.08)

(58) Field of Classification Search
CPC ........ A47J 31/44; A47J 31/46; A47J 31/4417; A47J 31/4482; A47J 2203/00; A47J 31/00; A47J 31/40; G07F 13/065; G07F 13/06; F25D 23/126; F25D 2323/021; F25D 2400/06; F25D 23/003; F25D 2323/023; F25D 2331/806; F25D 31/002; F25D 27/00; F25D 2327/001; G02B 6/0001

See application file for complete search history.

(56) References Cited

U.S. PATENT DOCUMENTS

| | | | | |
|---|---|---|---|---|
| 4,102,660 A | * | 7/1978 | Beckett | ...................... F25C 5/22 62/344 |
| 4,970,874 A | * | 11/1990 | Solak | ...................... F25D 23/00 312/116 |
| 5,463,877 A | * | 11/1995 | Young | ...................... A23G 9/22 222/146.6 |
| 9,625,205 B2 | * | 4/2017 | Becke | ...................... F25D 27/00 |

(Continued)

FOREIGN PATENT DOCUMENTS

| | | |
|---|---|---|
| DE | 10210161 A1 | 9/2003 |
| DE | 102007040308 A1 | 2/2009 |

(Continued)

*Primary Examiner* — Omar Rojas Cadima
(74) *Attorney, Agent, or Firm* — Dickinson Wright PLLC

(57) ABSTRACT

A drink maker (100) includes a body (110); a fluid system in the fluid system (147) disposed in the body; a control unit (180) to control the fluid system (147) for preparation of a beverage and a beverage container placement area (115); a recess (160) introduced in the body (110), being externally accessible and with at least one boundary wall (161, 162); a dispensing device (120) for dispensing the prepared beverage which is disposed in the recess (160); and an illumination device (170) for illuminating the recess (160). The illumination device (170) features a flat lighting body (171) disposed in the recess (160) for emitting light into the recess (160) and a light source (172) which can emit light into the lighting body (171).

11 Claims, 3 Drawing Sheets

(56) References Cited

U.S. PATENT DOCUMENTS

| | | | | |
|---|---|---|---|---|
| 2012/0103000 A1* | 5/2012 | Krause | ............... | F25D 23/126 |
| | | | | 62/389 |
| 2012/0103001 A1* | 5/2012 | Krause | ............... | F25D 23/126 |
| | | | | 62/389 |
| 2012/0180517 A1* | 7/2012 | Filho | ................ | B67D 1/0003 |
| | | | | 62/389 |

FOREIGN PATENT DOCUMENTS

| DE | 102012202184 A1 | 8/2013 |
|---|---|---|
| DE | 102016107086 A1 | 10/2017 |
| DE | 102017001173 A1 | 5/2018 |
| EP | 1762163 A1 | 3/2007 |
| EP | 2362744 A1 | 9/2011 |

* cited by examiner

DRINK MAKER WITH ILLUMINATION DEVICE

TECHNICAL FIELD

The present disclosure relates to a drink maker with a body; a fluid system disposed in the body; a control unit to control the fluid system for preparing a beverage; a beverage container placement area; a recess introduced in the body, the recess being externally accessible and having at least one boundary wall; a dispensing device for dispensing the prepared beverage, the dispensing device being disposed in the recess; and an illumination device for illuminating the recess in a region of the dispensing device.

BACKGROUND

From document EP 1 762 163 A1, a drink maker is known with a dispensing recess and an illumination device. The illumination device comprises lighting means which are disposed in the interior of the housing above the dispensing recess and generate a downward directed light beam. This light beam is guided through wall openings in the upper region of the recess to the dispensing area underneath.

An additional embodiment of the prior art is described in document DE 102 10 161 B4, wherein in this embodiment the illumination device comprises a light source disposed in the interior of the body; this light source cooperates with a light guide which guides the emitted light into the dispensing area.

SUMMARY

Thus the present disclosure presents a drink maker with an improved illumination. The advantages attainable with the present disclosure involve that a clear operation is possible in the overall dispensing area and/or in the overall recess. In this regard, the recess is illuminated at least almost comprehensively and almost uniformly, with little or no confusing formation of shadows.

In this case the illumination device of the drink maker comprises the following features:

at least one flat lighting body disposed in the recess for emitting light into the recess; and a light source which can emit light into the lighting body.

Preferably the light source comprises one or a plurality of LEDs, so that with little install space and low energy requirements, a sufficiently bright light source can be created.

In one expedient embodiment, the recess comprises a back wall, two opposing side walls, wherein the lighting body is arranged on at least one side wall and/or back wall. Due to the large-area emission of light into the recess and/or to the dispensing area, blocking of the emitted light is avoided, wherein even large containers cannot entirely disrupt the emergence of light. Thus the user can always see the recess entirely, even in a dark room, so that a secure handling of the beverage vessel is assured. A vessel already set in place or a vessel placed next to the dispenser will also be reliably detected even in a dark environment.

In an additional, overall advantageous embodiment, the lighting body comprises a translucent transparent disc configured as a flat wall section, wherein the light source is arranged on one side of the lighting body in order to introduce the light into the lighting body, wherein the lighting body comprises means for diverting and/or scattering the light beams. The scattering means are placed such that the injected light emerges from the area pointing to the recess, wherein a nearly uniform illumination of this area is assured.

In an overall expedient embodiment, the drink maker comprises a front-mounted, movable door, wherein the recess is arranged in the movable door, the disc [is arranged] in the side wall of the recess, wherein the light source is disposed in the fixed body such that with the door closed, it can introduce the light into the lighting body. The maintenance area with the supply containers and the waste and drain containers are located behind the door in the body. In the described embodiment the light sources are located in the fixed body, so that no movable cables are required for an electrical supply to the light sources. All components in the movable door are passive, so that an overall simple design is attained.

In another advantageous embodiment, the scatter disc is also disposed on the fixed body, as are the light sources. The illumination device used herein acts as a light guide for guiding the light beams from the scatter disc radiating into the recess. This is an advantage when space is present in the body to accommodate the scatter disc. Furthermore, the scatter disc with the light sources can be configured as an integral, one-part module, so that a vapor-tight and/or water-tight and consistently durable design is obtained. The lighting body herein is configured as a transparent wall or transparent wall section of the recess.

When the lighting body is arranged in one of the side walls or in both side walls, it extends over the range of 70% to 100% of the area of the particular side wall within the recess.

When the lighting body is arranged in the back wall, it extends over the range of 50% to 80% of the area of the back wall within the recess.

Overall it is advantageous that both opposing side walls are each provided with or equipped with a lighting body, each with correspondingly arranged light source. Thus the formation of shadows within the recess is mostly prevented.

In another overall advantageous embodiment, the control unit is configured to control and/or to activate the light source according to default scenarios with respect to the intensity and/or colors. For example an individual color can be assigned to one operating state. For example, a device on stand-by mode can be equipped with a subdued or dimmed lighting, wherein the lighting can be made brighter by activating the device. Once the beverage has been fully dispensed, this status can be signaled by a flashing light or by a repeatedly changing, sudden color change.

Overall it is expedient that the dispensing device is movably disposed inside the recess relative to the body and to the beverage container placement area.

One design example of the present disclosure is depicted schematically in the drawings. and is explained in greater detail below.

DETAILED DESCRIPTION OF THE DRAWINGS

Figure 1:
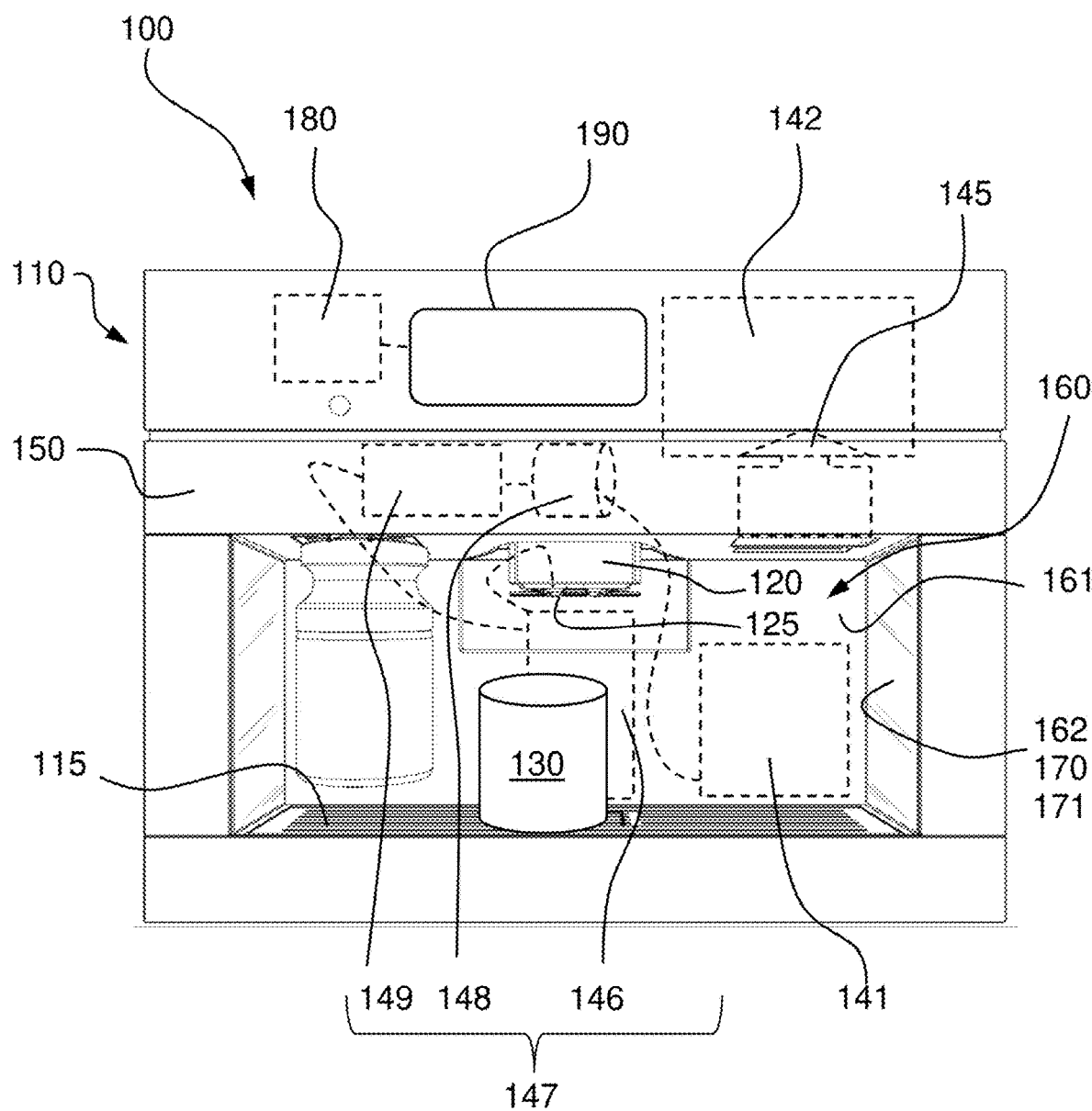
FIG. 1 shows a drink maker in a partially schematic front view.

FIG. 1 depicts a perspective representation of a hot beverage machine 100 according to one design embodiment.

The hot beverage machine 100 herein is configured as a fully automatic coffee maker, in the illustrated example, as a built-in fully automatic coffee maker. The hot beverage machine 100 features a body 110; the components for preparing the hot beverage are located inside the body. When sketched schematically, these are the supply containers 141 for water and for coffee beans 142, a grinding unit 145, the brewing unit 146 and the power supply system 147 with pump 148, liquid passage heater 149 and sensors for measuring the water temperature and/or flow volume. Furthermore, the hot beverage machine 100 features an operating device 190 for input of user selections, which is connected to a control unit 180 for control of the components for preparing the desired hot beverage, and a beverage container placement area or a placement area 115. The beverage container placement area 115 is configured as a molded, or differently produced recess 160 in the front-side door 150 for closing off the interior of the body 110. The beverage container placement area 115 is configured for placement of beverage containers 130, for example, coffee cups.

Furthermore, the hot beverage machine 100 features a dispensing device 120 with dispensing nozzles 125. The dispensing device 120, in one preferred embodiment, is configured as being movable relative to the body 110 and/or relative to the beverage container placement area 115. In the operating position of the hot beverage machine 100 depicted in FIG. 1, the dispensing device 120 is arranged above the beverage container placement area 115. The dispensing device 120 can be displaced toward the beverage container placement area 115 and away from the beverage container placement area 115, for example, manually or by means of a drive mechanism in the body 110. The dispensing device 120 is configured overall for filling at least one beverage container 130.

The placement area 115 is located in the recess 160, which is bordered by two opposing side walls 162 and the back wall 161 facing the body 110. In the illustrated example, both side walls 161 are equipped with a lighting body 171 of the illuminating device 170, wherein the lighting body 171 occupies the entire surface area of the side wall 162 in the illustrated example. The opposing side wall 161 is likewise provided with a flat lighting body 171 for emission of light. The recess 160 is located in the door 150, so that the boundary walls 161, 162 and the placement area 115 are moved along when the door 150 is pivoted.

Figure 2:
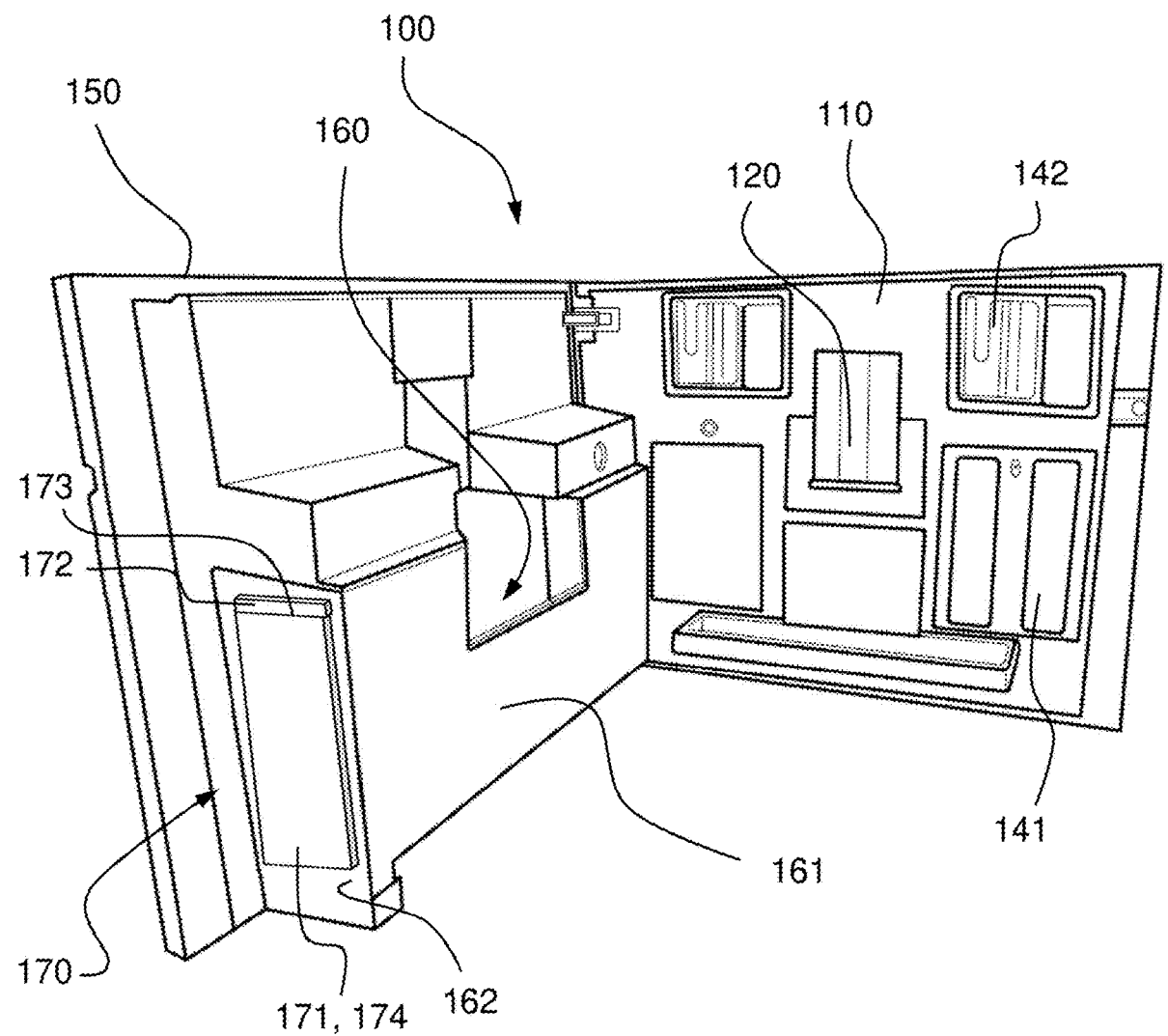
FIG. 2 shows a first example of the drink maker in an open door.

FIG. 2 depicts a perspective representation of a hot beverage machine 100 according to one design embodiment, with door 150 pivoted open. The maintenance area in the body 110 accessible from the front is clearly seen. The supply containers for adding water 141 and for adding beans 142 are accessible here. The height of the dispensing device 120 can be adjusted on the body 110. In the illustrated example, which corresponds to that of FIG. 1, the illumination device 170 is provided on the side wall 162 of the recess 160. It comprises a light source 172, which is arranged at the edge 173 of the lighting body 171, and can emit light therein. In this regard the lighting body 171 is provided with a scatter disc 174 or can be configured as such. The scatter disc 174 is configured such that it diverts and distributes the light beams arriving from the upper edge 173 to the recess 160, so that a large surface area of the side wall 162 or the entire side wall 162 on the side of the recess 160 is illuminated.

Accordingly, the illumination device 170 can be configured for the back wall 161 of the recess 160.

Figure 3:
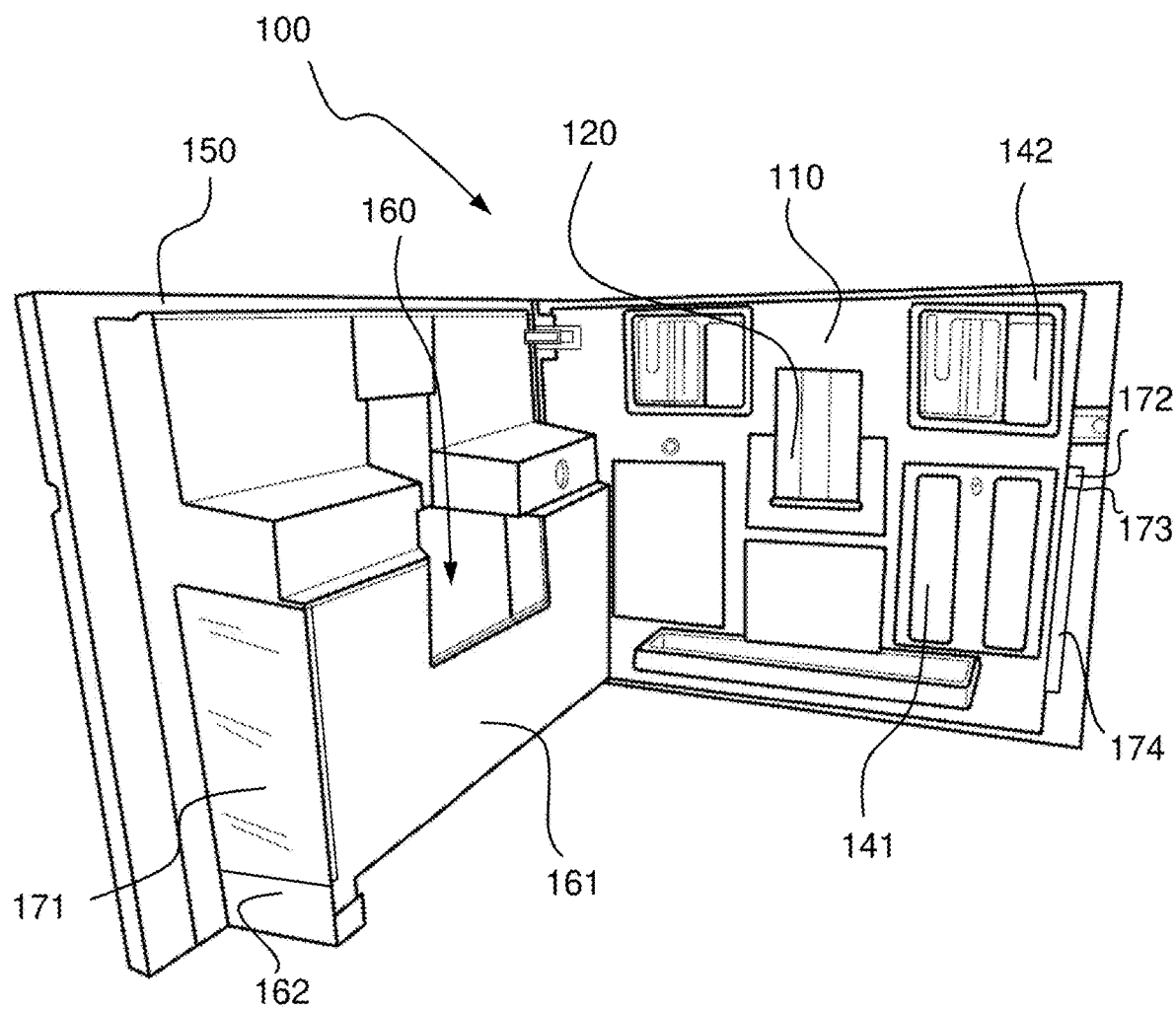
FIG. 3 shows a second example of the drink maker in an open door.

FIG. 3 provides a perspective illustration of a hot beverage machine 100 according to an additional design embodiment, with door 150 pivoted open. The maintenance area in the body 110 accessible from the front is clearly seen. The supply containers for adding water 141 and for adding beans 142 are accessible here. The height of the dispensing device 120 can be adjusted on the body 110. In the illustrated example, which corresponds to that of FIG. 1, the lighting body 171 for the illumination device 170 is provided on the side wall 162 of the recess 160. It comprises a light source 172, which is arranged at the edge 173 of the scatter disc 174, and can emit light therein. In this case the scatter disc 174 is configured as a unit. The scatter disc 174 is configured such that it diverts and distributes the light beams arriving from the upper edge 173 to the recess 160, when the door 150 is closed. Thus a large area of the side wall 162 or the entire side wall 162 on the side of the recess 160 can be illuminated only when the door 150 is closed. In the example, the light source 172 and the scatter disc 174 are provided on the body 110, wherein the lighting body 171 is arranged on the door-side wall 162 of the recess 160. It is configured as a transparent section of the side wall 162, so that the light beams emitted from the scatter disc 174 are directed through the lighting body 171 onward to the recess 160. In one advantageous refinement, the scatter disc 174 can be configured so that the light beams emitted from the surface area are guided in the direction of the front side of the body 110, so that with the door 150 open, the maintenance area in the interior of the body 110, and preferably the containers 141, 142 are illuminated. The lighting body 171 in this regard is configured such that light beams arriving at a downward slant are again directed to the side in the direction of the recess 160. With the door 150 closed, the side walls 162 are illuminated and/or the light beams are guided into the recess 160.

Accordingly, the illumination device 170 can be configured for the back wall 161 of the recess 160.

The direction and position statements for all embodiments pertain to the operating position of the beverage machine 100.

While the above description constitutes the preferred embodiments of the present invention, the invention is susceptible to modification, variation and change without departing from the proper scope and fair meaning of the accompanying claims.

What is claimed is:

1. A drink maker (100), comprising:
a body (110);
a fluid system (147) disposed in the body;
a control unit (180) to control the fluid system (147) for preparation of a beverage;
a beverage container placement area (115);
a recess (160) introduced in the body (110), being externally accessible and with a boundary wall (161, 162);
an outlet device (120) for dispensing the prepared beverage which is disposed in the recess (160);
an illumination device (170) for illuminating the recess (160), the illumination device (170) including:
a large area lighting body (171) disposed in the recess (160) for emitting light into the recess (160);
a light source (172) configured to emit light into the lighting body (171); and
wherein the lighting body (171) comprises a translucent or transparent plate configured as a flat wall section, wherein the light source (172) is arranged on one side (173) of the lighting body (171) and is configured to introduce the light into the lighting body (171), wherein the lighting body (171) comprises means (174) for diverting or scattering the light.

2. The drink maker (100) according to claim 1, wherein the light source (172) comprises one or a plurality of LEDs.

3. The drink maker (100) according to claim 1, wherein the recess (160) comprises walls including a back wall (161) and two opposing side walls (162), and the lighting body (171) is arranged on at least one of the walls (161, 162).

4. The drink maker (100) according to claim 1, further comprising a front-mounted, movable door (150), the movable door being movable relative to the body, wherein the recess (160) is arranged in the movable door (150) and the lighting body (171) is arranged in the side wall (162) of the recess (160), wherein the light source (172) is disposed in the body (110) such that with the door (150) closed, it can introduce the light into the lighting body (171).

5. The drink maker (100) according to claim 4, wherein a scattering disc (173) is disposed on the body (110), and wherein the lighting body (171) acts as a light guide for conducting the light from the body (110) into the recess (160).

6. The drink maker (100) according to claim 1, wherein the lighting body (171) extends over the range of 70% to 100% of the area of a side wall (162) of the recess (160).

7. The drink maker (100) according to claim 1, wherein the lighting body (171) extends over the range of 50% to 80% of the area of a back wall (161) of the recess (160).

8. The drink maker (100) according to claim 1, wherein the recess has two opposing side walls (162), each of which has a lighting body (171) with a respectively arranged light source (172).

9. The drink maker (100) according to claim 1, wherein the control unit (180) is configured to control or to activate the light source (172) according to default scenarios with respect to at least one of intensity and color.

10. The drink maker (100) according to claim 1, wherein the outlet device (120) is disposed inside the recess (160) and is movable relative to the body (110) and to the beverage container placement area (115).

11. The drink maker (100) according to claim 1, wherein the drink maker is configured for installation in a cabinet or a furniture recess.

* * * * *